United States Patent
Lee et al.

(10) Patent No.: US 9,715,375 B1
(45) Date of Patent: Jul. 25, 2017

(54) PARALLEL COMPILATION OF SOFTWARE APPLICATION

(71) Applicant: International Business Machines Corporation, Armonk, NY (US)

(72) Inventors: Cinderella Lee, Ontario (CA); Ying Chau R. Mak, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/008,257

(22) Filed: Jan. 27, 2016

(51) Int. Cl.
*G06F 9/45* (2006.01)

(52) U.S. Cl.
CPC ............. *G06F 8/427* (2013.01); *G06F 8/45* (2013.01)

(58) Field of Classification Search
CPC .... G06T 9/00; G06T 1/20; G06T 3/40; G06T 13/00; G06F 8/30; G06F 8/427; G06F 17/2247
See application file for complete search history.

(56) References Cited

U.S. PATENT DOCUMENTS

| | | | |
|---|---|---|---|
| 5,737,608 A * | 4/1998 | Van De Vanter | G06F 8/425 715/236 |
| 6,031,993 A * | 2/2000 | Andrews | G06F 8/33 707/999.1 |
| 8,250,464 B2 | 8/2012 | Dang et al. | |
| 2004/0001694 A1* | 1/2004 | Evans | G11B 20/10527 386/344 |
| 2007/0006191 A1* | 1/2007 | Franz | G06F 21/50 717/146 |
| 2007/0112714 A1* | 5/2007 | Fairweather | G06F 8/427 706/46 |
| 2007/0219933 A1* | 9/2007 | Datig | G06F 17/279 706/4 |
| 2007/0220063 A1* | 9/2007 | O'Farrell | G06F 17/277 |
| 2008/0189683 A1* | 8/2008 | Payette | G06F 8/41 717/114 |
| 2009/0006944 A1* | 1/2009 | Dang | G06F 17/272 715/234 |
| 2009/0326925 A1* | 12/2009 | Crider | G06F 8/30 704/9 |
| 2010/0037212 A1* | 2/2010 | Meijer | G06F 8/427 717/142 |
| 2012/0079364 A1 | 3/2012 | Agarwal et al. | |
| 2012/0260238 A1* | 10/2012 | Cheriton | G06F 9/4438 717/146 |
| 2014/0366008 A1* | 12/2014 | Cheriton | G06F 8/437 717/136 |

* cited by examiner

*Primary Examiner* — Chameli Das
(74) *Attorney, Agent, or Firm* — Shumaker & Sieffert, P.A.

(57) ABSTRACT

Techniques are described for parsing a software program using parallel processing. In one example, a method includes tokenizing input source text to form a token stream having a plurality of tokens, partitioning the token stream into partitions by division and by statement, parsing two or more of the partitions in parallel, and traversing the common symbol dictionary to detect semantic errors. Partitioning includes storing an entry representing each partition in a partition table, including scanning the token stream in reverse starting at the end of each division. Parsing the partitions in parallel includes building, for each statement partition, an annotated syntax tree (AST) to represent the statement, storing, for each symbol, an entry in a common symbol dictionary, and generating error messages corresponding to syntax errors detected while parsing the partitions.

16 Claims, 9 Drawing Sheets

PARALLEL COMPILATION OF SOFTWARE APPLICATION

TECHNICAL FIELD

This disclosure relates to software development tools.

BACKGROUND

The processing for a traditional compiler using parser generator technology can take a significant amount of time if the program is large. A usual solution for just-in-time syntax checking for compiled languages in an integrated development environment (IDE) is for the IDE's editor to include a separate syntax checker, which can operate on code fragments instead of full programs. The syntax checker's job may be limited to syntax checking only.

SUMMARY

In one aspect of the invention, a method includes tokenizing, with one or more processing devices, input source text to form a token stream having a plurality of tokens, wherein the input source text is organized in two or more divisions and includes a plurality of statements in a compiled program language; partitioning, with the one or more processing devices, the token stream into partitions by division and by statement, wherein partitioning includes storing an entry representing each partition in a partition table and wherein partitioning by statement includes scanning the token stream in reverse starting at a statement end; parsing two or more of the partitions in parallel with the one or more processing devices, wherein parsing the partitions in parallel includes building, for each statement partition, an annotated syntax tree (AST) to represent the statement, storing, for each symbol, an entry in a common symbol dictionary, and generating error messages corresponding to syntax errors detected while parsing the partitions; and traversing the common symbol dictionary, with the one or more processing devices, to detect semantic errors.

In another aspect of the invention, a computer program product includes a computer-readable storage medium having program code embodied therewith, the program code executable by a computing device to tokenize input source text to form a token stream having a plurality of tokens, wherein the input source text is organized in two or more divisions and includes a plurality of statements in a compiled program language; partition the token stream into partitions by division and by statement, wherein partitioning includes storing an entry representing each partition in a partition table and wherein partitioning by statement includes scanning the token stream in reverse starting at a statement end; parse two or more of the partitions in parallel, wherein parsing the partitions in parallel includes building, for each statement partition, an annotated syntax tree (AST) to represent the statement, storing, for each symbol, an entry in a common symbol dictionary, and generating error messages corresponding to syntax errors detected while parsing the partitions; and traverse the common symbol dictionary to detect semantic errors.

In yet another aspect of the invention, a computer system comprises one or more processors, one or more computer-readable memories, and one or more computer-readable storage mediums; program instructions, stored on at least one of the one or more storage mediums for execution by at least one of the one or more processors via at least one of the one or more memories, to tokenize input source text to form a token stream having a plurality of tokens, wherein the input source text is organized in two or more divisions and includes a plurality of statements in a compiled program language; program instructions, stored on at least one of the one or more storage mediums for execution by at least one of the one or more processors via at least one of the one or more memories, to partition the token stream into partitions by division and by statement, wherein partitioning includes storing an entry representing each partition in a partition table and wherein partitioning by statement includes scanning the token stream in reverse starting at a statement end; program instructions, stored on at least one of the one or more storage mediums for execution by at least one of the one or more processors via at least one of the one or more memories, to parse two or more of the partitions in parallel with the one or more processors, wherein parsing the partitions in parallel includes building, for each statement partition, an annotated syntax tree (AST) to represent the statement, storing, for each symbol, an entry in a common symbol dictionary, and generating error messages corresponding to syntax errors detected while parsing the partitions; and program instructions, stored on at least one of the one or more storage mediums for execution by at least one of the one or more processors via at least one of the one or more memories, to traverse the common symbol dictionary to detect semantic errors.

The details of one or more embodiments of the invention are set forth in the accompanying drawings and the description below. Other features, objects, and advantages of the invention will be apparent from the description and drawings, and from the claims.

DETAILED DESCRIPTION

A traditional compiler using parser generator technology is not suitable to work directly under an integrated development environment (IDE) as a just-in-time syntax checker. This is because such parser is designed to process a source file in lexical order from top to bottom. The disadvantage of this approach using a just-in-time syntax checker is that often the syntax checker and the corresponding production compiler are out of synchronization in terms of release version, causing the syntax checker to report incorrect diagnostics (with respect to what is supported by the production compiler). Various implementations of this disclosure may resolve these problems among other advantages, as further described below.

The grammar of COBOL is relatively simple in comparison to later languages like C++, the JAVA™ programming language, C, or C#. COBOL's grammar is defined in such a way that parsing may be done with almost no look ahead. (A typical exception is the expression within a COMPUTE statement.) This makes it easy to detect the starting point of a statement without the full machinery of a formal parser. Also, a COBOL program is partitioned into separate divisions (starting with the environment division) with no ambiguity. Each of these divisions, and statements, can be parsed and processed in parallel, provided there is a symbol dictionary which can be accessed by all the parallel sub-tasks. The dictionary serves as the semantics link between the different parts of a program. Some implementations of this disclosure may address programs written in COBOL, while other implementations may also be used with programs written in other compiled languages including C++, the JAVA™ programming language, C, and C#.

Figure 1:
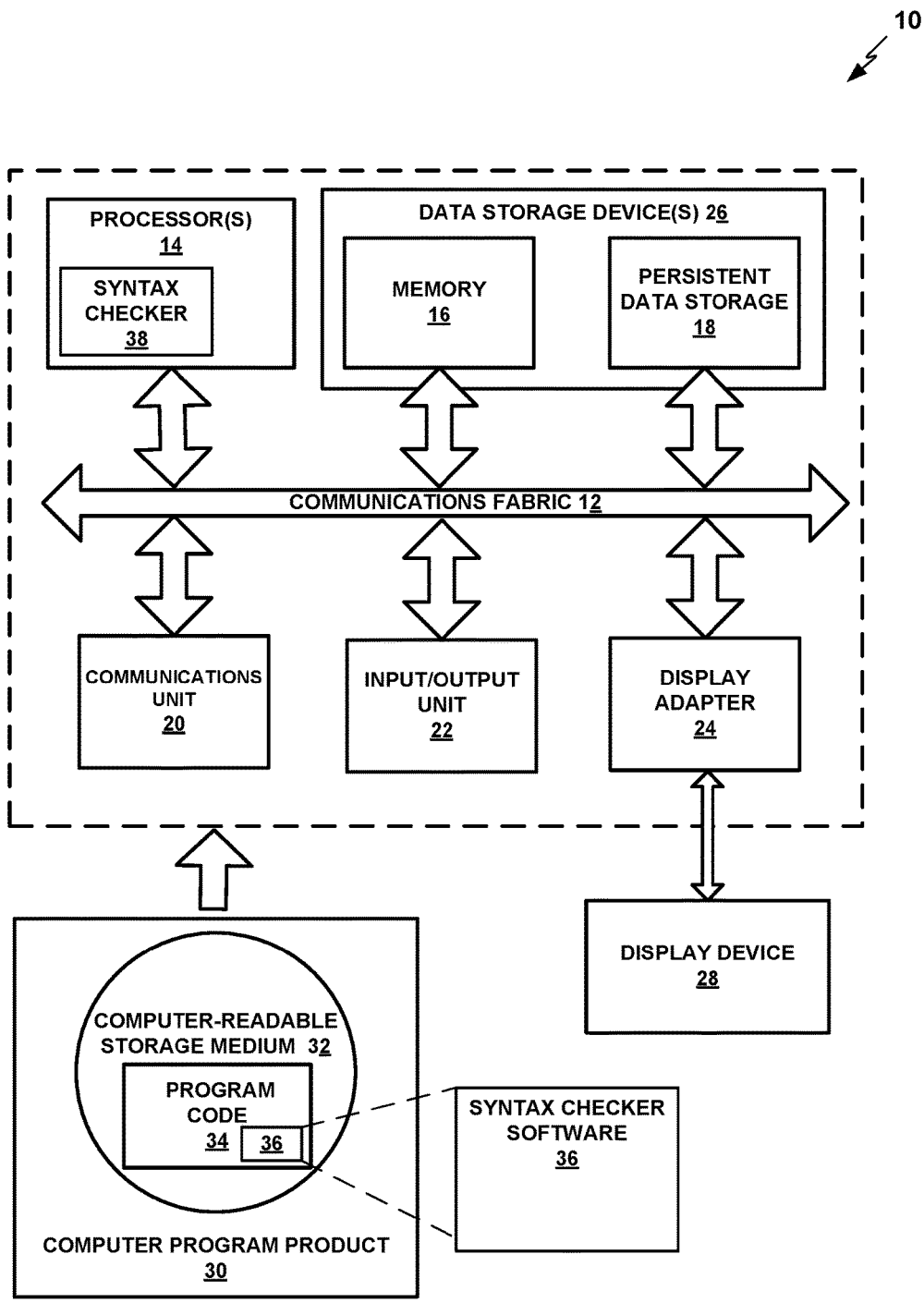
FIG. 1 is a block diagram of a computing device used to implement a syntax checker, in one aspect of this disclosure.

FIG. 1 is a block diagram of a computing device used to implement a syntax checker, in one aspect of this disclosure. Computing device 10 may be a computer or a server such as a web server or an application server. Computing device 10 may provide an integrated development environment (IDE), including a virtual server that may be run from or incorporate any number of computing devices. Computing device 10 may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of computing device 10 may include a computer having capabilities or formats other than or beyond those described herein.

In the illustrative example of FIG. 1, computing device 10 includes communications fabric 12, which provides communications between one or more processor units 14, memory 16, persistent data storage 18, communications unit 20, and input/output (I/O) unit 22. Communications fabric 12 may include a dedicated system bus, a general system bus, multiple buses arranged in hierarchical form, any other type of bus, bus network, switch fabric, or other interconnection technology. Communications fabric 12 supports transfer of data, commands, and other information between various subsystems of computing device 10.

Processor unit 14 may be a programmable central processing unit (CPU) configured for executing programmed instructions stored in memory 16. In another illustrative example, processor unit 14 may be implemented using one or more heterogeneous processor systems in which a main processor is present with secondary processors on a single chip. In yet another illustrative example, processor unit 14 may be a symmetric multi-processor system containing multiple processors of the same type. Processor unit 14 may be a reduced instruction set computing (RISC) microprocessor such as a PowerPC® processor or IBM z System from IBM® Corporation, an x86 compatible processor such as a Pentium® processor from Intel® Corporation, an Athlon® processor from Advanced Micro Devices® Corporation, or any other suitable processor. In various examples, processor unit 14 may include a multi-core processor, such as a dual core or quad core processor, for example. Processor unit 14 may include multiple processing chips on one die, and/or multiple dies on one package or substrate, for example. Processor unit 14 may also include one or more levels of integrated cache memory, for example. In various examples, processor unit 14 may include one or more CPUs distributed across one or more locations.

Data storage 26 includes memory 16 and persistent data storage 18, which are in communication with processor unit 14 through communications fabric 12. Memory 16 can include a random access semiconductor memory (RAM) for storing application data, i.e., computer program data, for processing. While memory 16 is depicted conceptually as a single monolithic entity, in various examples, memory 16 may be arranged in a hierarchy of caches and in other memory devices, in a single physical location, or distributed across a plurality of physical systems in various forms. While memory 16 is depicted physically separated from processor unit 14 and other elements of computing device 10, memory 16 may refer equivalently to any intermediate or cache memory at any location throughout computing device 10, including cache memory proximate to or integrated with processor unit 14 or individual cores of processor unit 14.

Persistent data storage 18 may include one or more hard disc drives, solid state drives, flash drives, rewritable optical disc drives, magnetic tape drives, or any combination of these or other data storage media. Persistent data storage 18 may store computer-executable instructions or computer-readable program code for an operating system, application files including program code, data structures or data files, and any other type of data. These computer-executable instructions may be loaded from persistent data storage 18 into memory 16 to be read and executed by processor unit 14 or other processors. Data storage 26 may also include any other hardware elements capable of storing information, such as, for example and without limitation, data, program code in functional form, and/or other suitable information, either on a temporary basis and/or a permanent basis.

Persistent data storage 18 and memory 16 are examples of computer-readable hardware storage devices. Data storage 26 may include any of various forms of volatile memory that may require being periodically electrically refreshed to maintain data in memory, while those skilled in the art will recognize that this also constitutes an example of a computer-readable hardware storage device. Executable instructions may be stored on a computer-readable hardware storage device when program code is loaded, stored, relayed, buffered, or cached on a computer-readable hardware storage device, including if only for only a short duration or only in a volatile memory format.

Processor unit 14 can also be suitably programmed to read, load, and execute computer-executable instructions or computer-readable program code for a syntax checker 38, as described in greater detail below. In one example approach, as shown in FIG. 1, program code 34 includes syntax checker software 36 for implementing a syntax checker 38 on a computing device such as computing device 10. The program code may be stored on memory 16, persistent data storage 18, or elsewhere in computing device 10. This program code may also take the form of program code 34 stored on computer-readable medium 32 comprised in computer program product 30, and may be transferred or communicated, through any of a variety of local or remote means, from computer program product 30 to computing device 10 to be enabled to be executed by processor unit 14, as further explained below.

The operating system may provide functions such as device interface management, memory management, and multiple task management. The operating system can be a Unix based operating system such as the AIX® operating system from IBM® Corporation or Linux, a non-Unix based operating system such as the Windows® family of operating systems from Microsoft® Corporation, a network operating system such as the JAVA™ operating system from Oracle® Corporation, or any other suitable operating system. Processor unit 14 may be suitably programmed to read, load, and execute instructions of the operating system.

Communications unit 20, in this example, provides for communications with other computing or communications systems or devices. Communications unit 20 may provide communications through the use of physical and/or wireless communications links. Communications unit 20 may include a network interface card for interfacing with a LAN, an Ethernet adapter, a Token Ring adapter, a modem for connecting to a transmission system such as a telephone line, or any other type of communication interface. Communications unit 20 can be used for operationally connecting many types of peripheral computing devices to computing device 10, such as printers, bus adapters, and other computers. Communications unit 20 may be implemented as an expansion card or be built into a motherboard, for example.

The input/output unit 22 can support devices suited for input and output of data with other devices that may be connected to computing device 10, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 22 may also include any type of interface for video output in any type of video output protocol and any type of monitor or other video display technology, in various examples. It will be understood that some of these examples may overlap with each other, or with example components of communications unit 20 or data storage 26. Input/output unit 22 may also include appropriate device drivers for any type of external device, or such device drivers may reside elsewhere on computing device 10 as appropriate.

Computing device 10 also includes a display adapter 24 in this illustrative example, which provides one or more connections for one or more display devices, such as display device 28, which may include any of a variety of types of display devices. It will be understood that some of these examples may overlap with example components of communications unit 20 or input/output unit 22. Input/output unit 22 may also include appropriate device drivers for any type of external device, or such device drivers may reside elsewhere on computing device 10 as appropriate. Display adapter 24 may include one or more video cards, one or more graphics processing units (GPUs), one or more video-capable connection ports, or any other type of data connector capable of communicating video data, in various examples. Display device 28 may be any kind of video display device, such as a monitor, a television, or a projector, in various examples.

Input/output unit 22 may include a drive, socket, or outlet for receiving computer program product 30, which comprises a computer-readable medium 32 having computer program code 34 stored thereon. For example, computer program product 30 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 32 may include any type of optical, magnetic, or other physical medium that physically encodes program code 34 as a binary series of different physical states in each unit of memory that, when read by computing device 10, induces a physical signal that is read by processor 14 that corresponds to the physical states of the basic data storage elements of storage medium 32, and that induces corresponding changes in the physical state of processor unit 14. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 14, thereby physically causing or configuring processor unit 14 to generate physical outputs that correspond to the computer-executable instructions, in a way that causes computing device 10 to physically assume new capabilities that it did not have until its physical state was changed by loading the executable instructions comprised in program code 34.

In some illustrative examples, program code 34 may be downloaded over a network to data storage 26 from another device or computer system for use within computing device 10. Program code 34 comprising computer-executable instructions may be communicated or transferred to computing device 10 from computer-readable medium 32 through a hard-line or wireless communications link to communications unit 20 and/or through a connection to input/output unit 22. Computer-readable medium 32 comprising program code 34 may be located at a separate or remote location from computing device 10, and may be located anywhere, including at any remote geographical location anywhere in the world, and may relay program code 34 to computing device 10 over any type of one or more communication links, such as the Internet and/or other packet data networks. The program code 34 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 34 may be transmitted from a source computer-readable medium 32 over non-tangible media, such as communications links or wireless transmissions containing the program code 34. Program code 34 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 10.

A traditional compiler using parser generator technology is not suitable to work directly under an IDE as a just-in-time syntax checker. This is because such parser is designed to process a source file in lexical order from top to bottom. The processing can take a significant amount of time if the program is large. A usual solution is for the IDE's editor to include a separate syntax checker, which can operate on code fragments instead of full programs. Its job is limited to syntax checking only. The disadvantage of this approach is that often times the syntax checker and the corresponding production compiler are out of synchronization in terms of release version, causing the syntax checker to report incorrect diagnostics (with respect to what is supported by the production compiler). In one example approach, syntax checker 38 solves the problem by providing a parsing method that can be adapted to both requirements.

Figure 2:
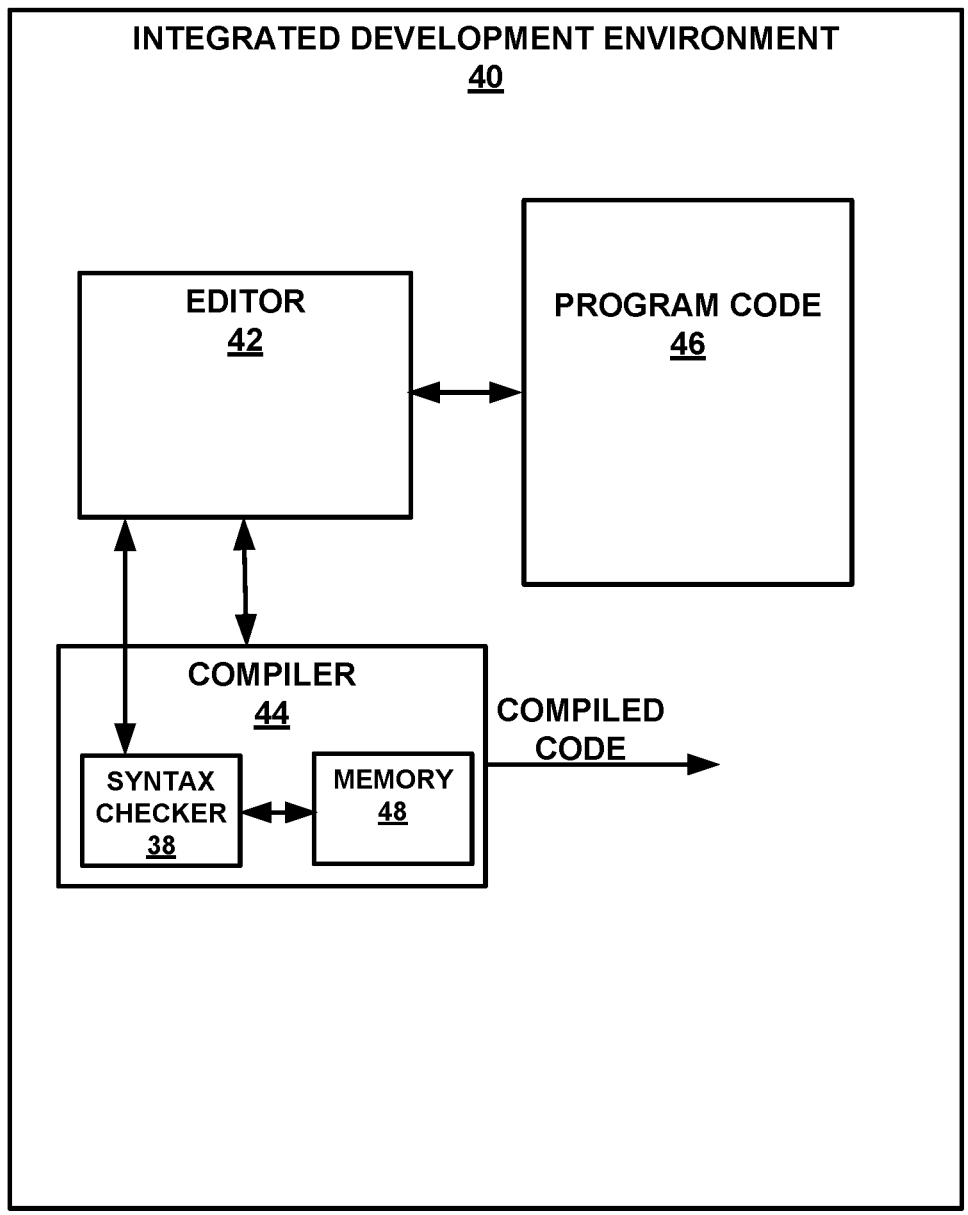
FIG. 2 is an example block diagram of an integrated development environment, in one aspect of this disclosure.

FIG. 2 is an example block diagram of an integrated development environment, in one aspect of this disclosure. In the example approach of FIG. 2, integrated development environment 40 includes an editor 42 and a compiler 44 having a syntax checker 38 and a memory 48. In the example approach of FIG. 2, syntax checker 38 is used by both editor 42 and compiler 44 to track syntax and semantic errors in program code 46. In one example approach, editor 42 is used to provide a programmer with tools needed to edit and test program code 46. Compiler 44 produces compiled code from program code 46. In one example approach, syntax checker 38 stores partition tables and symbol dictionaries to memory 48 and updates the partition tables and symbol dictionaries as necessary to reflect changes in program code 46.

Figure 3:
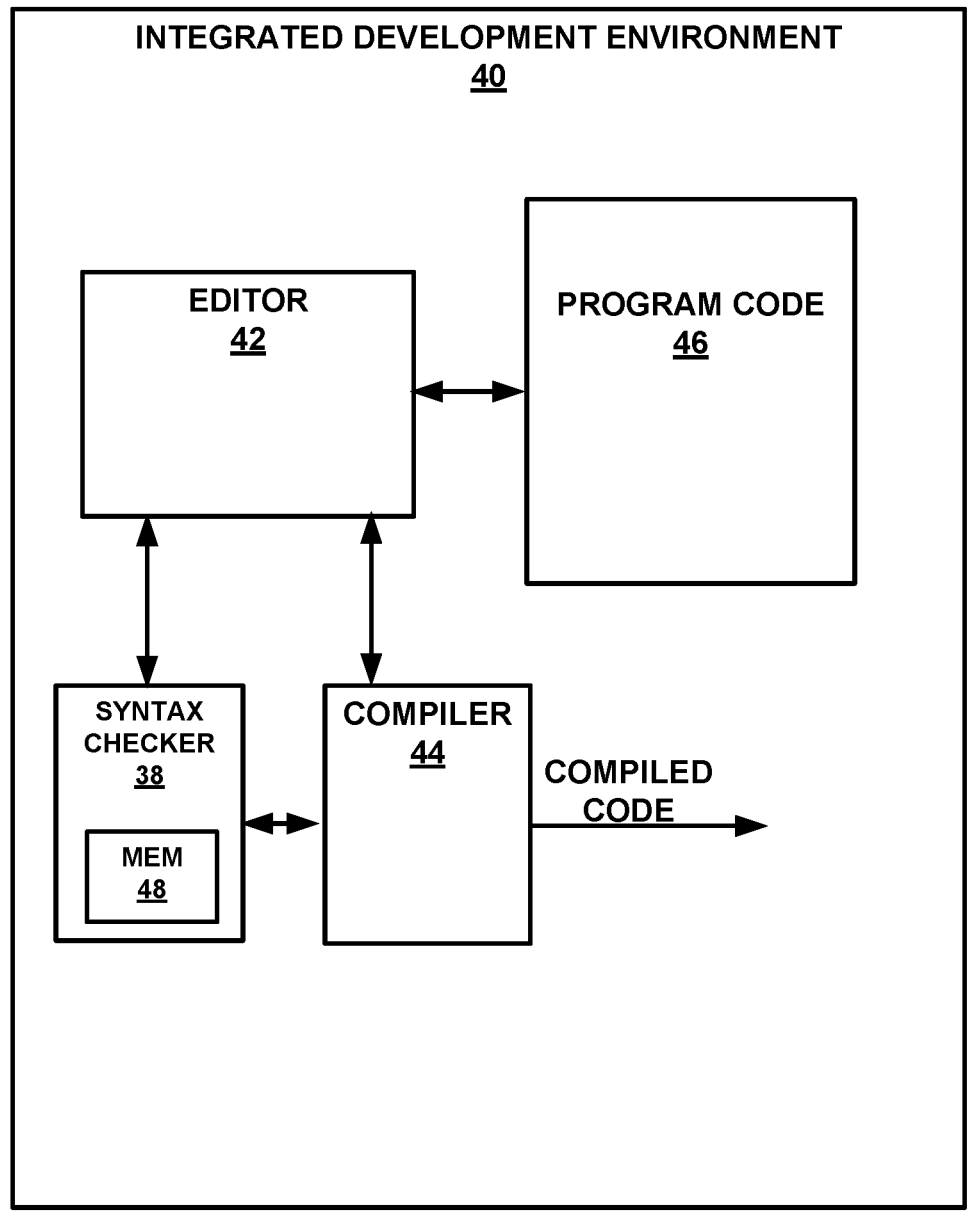
FIG. 3 is another example block diagram of an integrated development environment, in one aspect of this disclosure.

FIG. 3 is another example block diagram of an integrated development environment, in one aspect of this disclosure. In the example approach of FIG. 3, integrated development environment 40 includes an editor 42, a compiler 44 and a syntax checker 38. In the example shown, syntax checker 38 is separate from editor 42 and compiler 44 and can be updated independently of either editor 42 or compiler 44. Syntax checker 38 is used by both editor 42 and compiler 44 to track syntax and semantic errors in program code 46. In one example approach, editor 42 is used to provide a programmer with tools needed to edit and test program code 46. Compiler 44 produces compiled code from program code 46. In one example approach, syntax checker 38 stores partition tables and symbol dictionaries to memory 48 and updates the partition tables and symbol dictionaries as necessary to reflect changes in program code 46.

As noted above, the grammar of COBOL is relatively simple in comparison to later languages like C++, the JAVA™ programming language or C#. COBOL's grammar is defined in such a way that parsing can be done with almost no look ahead. This makes it easy to detect the starting point of a statement without the full machinery of a formal parser. Also a COBOL program is partitioned into separate divisions (starting with the environment division) with no ambiguity. Each of these divisions, and statements, can be parsed and processed in parallel, provided there is a symbol dictionary which can be accessed by all the parallel sub-tasks. The dictionary serves as the semantics link between the different parts of a program.

Figure 4:
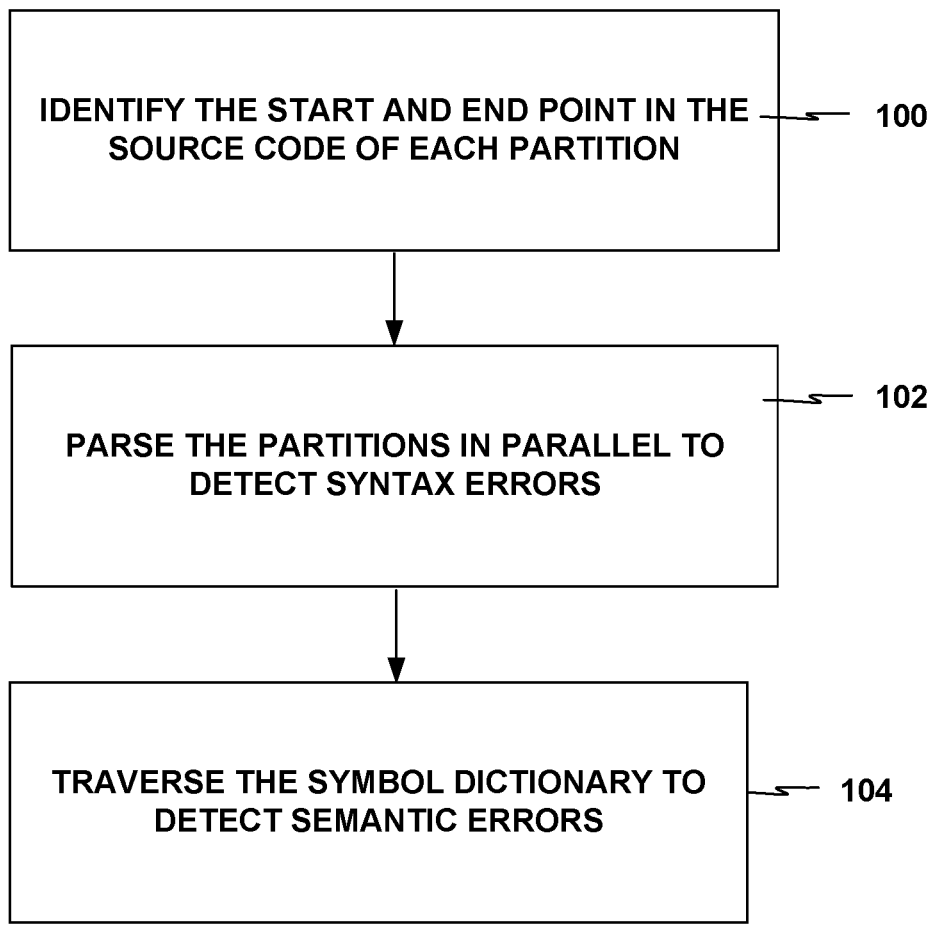
FIG. 4 depicts a flowchart of an example process that a syntax checker, executing on one or more computing devices (e.g., servers, computers, processors, etc.), may perform, in one aspect of this disclosure.

FIG. 4 depicts a flowchart of an example process that a syntax checker, executing on one or more computing devices (e.g., servers, computers, processors, etc.), may perform, in one aspect of this disclosure. In the example approach of FIG. 4, the parsing is not in the same lexical order as presented in the source file. This gives more freedom to compiler 44 (in FIG. 3) to prioritize compiler 44's own work according to usage context. For example, if usage is within an IDE 40 and the compiler 44 is being used as a just-in-time syntax checker while the programmer is editing the source code on screen, compiler 44 can process first the source code area that the programmer is modifying (and report syntax error immediately), before parsing the rest of the source. Another usage is for the compiler 44 to do parsing in a parallel mode.

In one aspect, the grammar of program code 46 is structured into two levels, a high level grammar which detects major divisions of a program and a low level grammar which describes a statement. These two in combination identify the starting point of partitions where parsing can happen in parallel.

In another aspect, when scanning the token stream to identify partitions, scanning happens in reverse, starting at the end of a statement, and then scanning backwards.

In the example approach of FIG. 4, syntax checker 38 of FIG. 3 identifies the starting point in the source code of each partition that can be processed in parallel (100). In the procedure division, this is the starting point of each statement. These partitions are kept on a partition list. Syntax checker 38 initiates parallel sub-tasks which pick partitions from the partition list, and then does the actual parsing (102). In one example approach, syntax errors are detected at this point. After all the partitions are processed, syntax checker 38 traverses the symbol dictionary to detect semantics errors (104).

Figure 5:
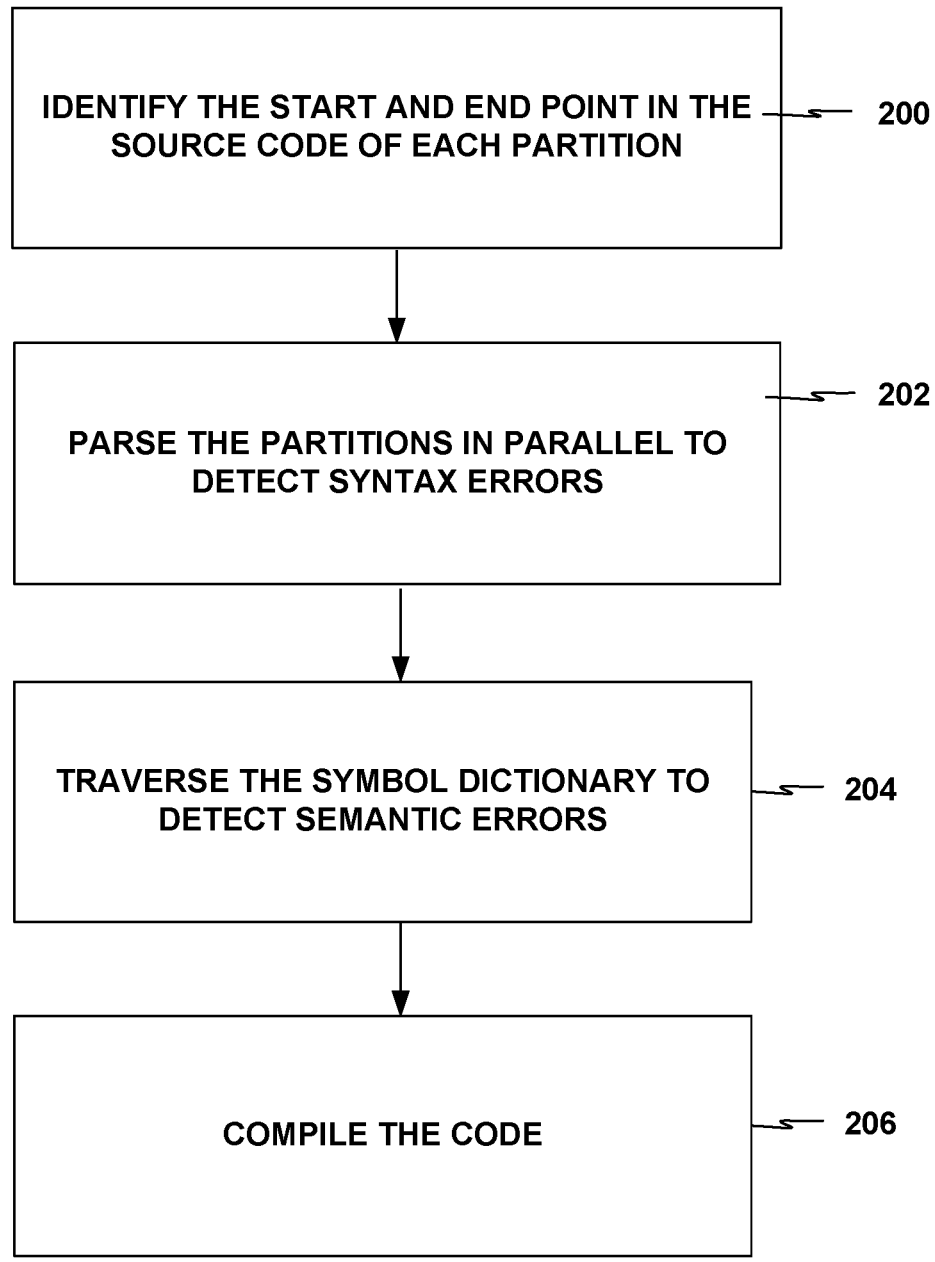
FIG. 5 depicts a flowchart of an example process that a syntax checker and a compiler, executing on one or more computing devices (e.g., servers, computers, processors, etc.), may perform, in one aspect of this disclosure.

FIG. 5 depicts a flowchart of an example process that a syntax checker and a compiler, executing on one or more computing devices (e.g., servers, computers, processors, etc.), may perform, in one aspect of this disclosure. In the example approach of FIG. 5, a syntax checker 38 identifies the starting point in the source code of each partition that can be processed in parallel (200). In the procedure division, this is the starting point of each statement. These partitions are kept on a partition list. Syntax checker 38 initiates parallel sub-tasks which pick partitions from the partition list, and then does the actual parsing (202). In one example approach, syntax errors are detected at this point. After all the partitions are processed, syntax checker 38 traverses the symbol dictionary to detect semantics errors (204). Then compiler 44 compiles program code 46 into compiled program code (206).

In one example approach, the methods of FIGS. 4 and 5 scan the token stream to identify partitions, scanning in reverse, starting at the end of a statement, and then scanning backwards. This is an efficient method to identify partitions. In one example approach, in response to the partitions being identified, they are used to feed parallel processing of the partitions.

Note that this is not the usual parser using a "reverse" grammar, which involves a full parser generated on a full reverse grammar. The reverse operation of the present approach involves token scanning, and is used to detect landmarks in the program to identify partitions. This may be a more efficient operation than a full parser generated on a full reverse grammar. A full reverse parser suffers the same drawback as a forward parser as pointed out earlier.

As with known compilers, syntax checker 38 tokenizes the input source file into a token stream. Syntax checker 38 then works at the token level. In one example approach, syntax checker 38 performs any necessary copy file processing and incorporates any needed copy files in the token stream.

One point to note is the handling of the period character in COBOL. The period character forms one token if it marks the end of a statement. However, a period can also be used in other contexts (e.g., in numeric literals). In this case, the COBOL rule is clear, and syntax checker 38 has enough information to form, for example, the numeric literal token with local information without ambiguity.

In one example approach, a high level grammar defines the divisions of program code 46. In one COBOL example, editor 42 depicts the divisions as follows, where < . . . > signifies a non-terminal and { . . . } represents optional repeats.

<Cobol program>::=
IDENTIFICATION DIVISION.
{<token>}
ENVIRONMENT DIVISION.
{<token>}
DATA DIVISION
{<token>}
PROCEDURE DIVISION.
{<token>}

The purpose of this high level grammar is to identify the major parts in a source file.

In one example approach, a low level grammar provides details inside each of these divisions. The examples given below focus on the procedure division, but the concepts apply to the other divisions as well. (The grammar for each statement types are defined in the COBOL Language Reference.)

In the following, statement type is the keyword (a terminal in the grammar) which marks the beginning of a COBOL statement. Examples are ADD, COMPUTE, DIVIDE, MULTIPLY, SUBTRACT, ACCEPT, INITIALIZE, INSPECT, MOVE, SET, STRING, UNSTRING, XML (GENERATE or PARSE), STOP (RUN), EXIT, PROGRAM or METHOD), GOBACK, ACCEPT, CLOSE, DELETE, DISPLAY, OPEN, READ, REWRITE, START, STOP, WRITE, MERGE, RELEASE, RETURN, SORT, ALTER, EXIT, GO (TO), PERFORM, CALL, CANCEL, INVOKE, IF, and EVALUATE. One may also write statement type without angle brackets to stand for this terminal.

After the major parts (the four divisions) are identified, syntax checker 38 parses the divisions in parallel. The present example focusses on the procedure division.

Syntax checker 38 may process the procedure division using more than one sub-task (i.e., not just have one sub-task parsing all of the procedure division from start to finish). In one example approach, syntax checker 38 may identify partitions within the procedure division. In particular, syntax checker 38 may locate the starting point of a statement, and then partition the procedure division into statements. Syntax checker 38 may do this efficiently and without the full machinery of a parser. Syntax checker 38 may do this by detecting statement type, and scanning the token stream in reverse. Reverse token stream scanning is represented by the grammar below (note that [ . . . ] indicates optional syntax):
<explicit statement terminator>::=Statement terminators (e.g., END-READ, END-XML)
<imperative statement>::/*note that this grammar rule is done in reverse*/
  [<explicit statement terminator>]
  {<token>}
  <statement type>
<imperative statements>::={<imperative statement>}

The beginning of a statement is the statement type token. (In one example, IF and READ are statement types.) In the grammar of COBOL statements, the construction
  statement-type . . . statement-terminator
forms a nested structure. That is, within statement-type . . . statement-terminator, there could be nested imperative statements with the corresponding ENDs. But the statement-type and the END must match (if a statement-terminator token exists).

In the grammar, statement terminators are used in conditional statements. Beside IF and EVALUATE statements, conditional statements also include (for example): ADD . . . ON SIZE ERROR imperative statements END-ADD. In one example approach, the full list of conditionals includes ON SIZE ERROR, ON OVERFLOW, ON EXCEPTION, INVALID KEY, AT END, AT END-OF-PAGE, NOT ON SIZE ERROR, NOT ON OVERFLOW, NOT ON EXCEPTION, NOT INVALID KEY, NOT AT END, and NOT AT END-OF-PAGE. Statements like ADD . . . ON SIZE ERROR are conditionals in the grammar. In one example approach, the key phrase ON SIZE ERROR is referred to as a conditional marker. IF and EVALUATE are also conditionals. In another example approach, syntax checker 38 may not include these tokens as conditional markers.

Examples of this disclosure may use a non-terminal conditional marker.

<conditional marker>::={ON SIZE ERROR, ON OVERFLOW, AT END, . . . }

In one example approach, a conditional marker is always paired up with the conditional marker's corresponding (immediately previous) statement type. In one such example approach, there cannot be other imperative statements in between. Note, in this example approach, IF and EVALUATE are not conditional markers for the purpose here.

This means that if syntax checker 38 is scanning in reverse, starting at the end of a procedure division, in response to syntax checker 38 encountering a statement terminator, syntax checker 38 can expect to find, eventually, a conditional marker token or a statement type in the same statement scope. In this case, syntax checker 38 may define statement scope to be zero at the end of the procedure division when syntax checker 38 starts parsing (e.g., the outermost), and then increase one as syntax checker 38 encounters statement terminator, and decrease one in response to syntax checker 38 successfully hitting the corresponding statement type. That means, in one example approach, this can be handled by a stack based algorithm. The beginning of each statement type defines a partition. The statement's syntactic scope covers until the corresponding statement terminator, if present, or until (but excluding) the next statement type, or until a period token.

The period token is an implicit statement terminator. The period token ends all outstanding statement scopes.

Figure 6:
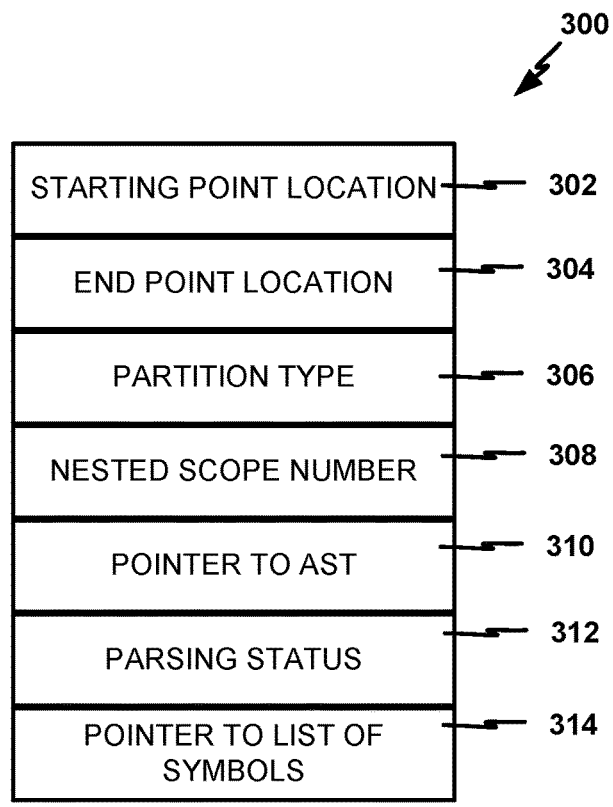
FIG. 6 illustrates a partition table, according to one aspect of this disclosure.

Syntax checker 38 defines the partition table. FIG. 6 illustrates a partition table 300, according to one aspect of this disclosure. In one example approach, as is shown in FIG. 6, partition table 300 is an array, with each entry defining a partition. (The example of FIG. 6 focuses on the procedure division, but the concepts discussed apply to the other divisions as well.) In one such example approach, each array entry in the partition table contains the following information:

1. Starting point location of the partition (the position in the token stream) (302)
2. End point location of the partition (In one example approach, this is defined as the token immediately after the last token in the statement) (304)
3. Partition type. (i.e., procedure division/statement-type) (306)
4. Nested scope number. (An integer as defined above for statement-type . . . statement terminator constructs) (308)
5. Pointer to the AST representing this statement (310)
6. Parsing status (not started/in progress/done) (312)

7. Pointer to a list of symbols (entries in the symbol dictionary) which this partition defines or references (314)

Figure 7:
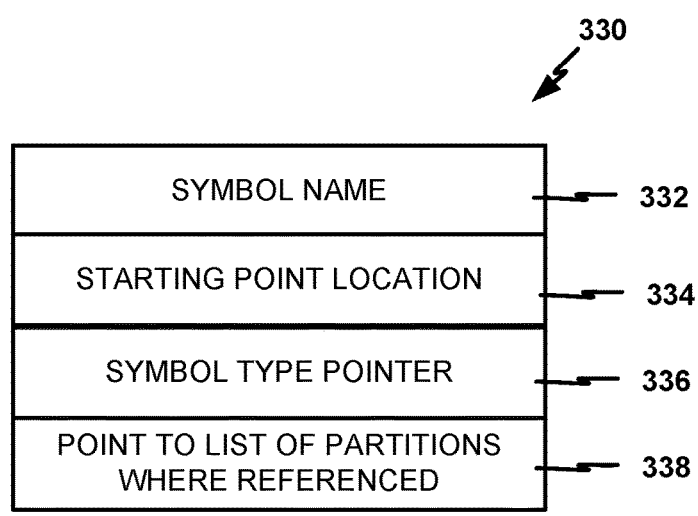
FIG. 7 illustrates a symbol dictionary, according to one aspect of this disclosure.

Syntax checker 38 also defines the symbol dictionary. FIG. 7 illustrates a symbol dictionary 330, according to one aspect of this disclosure. Symbol dictionary 330 contains all the identifiers used in program code 46, included variable names, and section and paragraph names. In one example approach, as is shown in FIG. 7, each entry in the dictionary contains the following information:

1. Symbol name (332)
2. Starting point location of the partition where the symbol is defined (i.e., the position in the token stream) (334)
3. Pointer to a symbol's (possible) type list (336)
4. Pointer to a list of partitions where this symbol is referenced (e.g., cross-reference information; a partition is defined by the partition's starting point location in the token stream) (338)

Because compiling may be performed in parallel, syntax checker 38 builds up the entries in the symbol dictionary 330 gradually. At any one point in time, not all fields in a symbol entry may be filled in, except the symbol name. In one example approach, the symbol dictionary is a common symbol dictionary accessible by each task or thread parsing a partition.

An example of the processing follows. Suppose the statement in the partition is a CALL statement such as "CALL MY-SUB." When syntax checker 38 parses this statement, the variable MY-SUB may not be defined in dictionary 330 yet (as the working-storage section may still being processed by another sub-task). Syntax checker 38 may build an AST for this CALL statement, and hang the AST off data field 310 in partition table 300. Syntax checker 38 may check the variable MY-SUB against the dictionary 330. If syntax checker 38 does not find the variable, syntax checker 38 may create an entry, with a symbol type list pointed to by pointer 336 signifying the acceptable types expected of this variable. (Syntax checker 38 may have that information accessible from the grammar.) In this case, the picture of the variable must be either X or A. Later on, when syntax checker 38 processes the actual definition of the variable (in the working-storage partition), syntax checker 38 may collapse this list into the actual type. In one example approach, diagnostics can be emitted when the collapse leads to error (conflicts between the actual definition and the expectation). Since MY-SUB can be referenced again later in another partition, syntax checker 38 may update the type list continuously to reflect the current restriction (expectation) on this variable. Syntax checker 38 may detect errors at any of these partition parsing tasks.

As described above, there may be imperative statements within a statement. One example is "ADD . . . ON SIZE ERROR imperative statements END-ADD." In partition table 300, the ADD statement is represented by an entry. The end point location 304 is the token END-ADD. Each imperative statement inside imperative statements may be represented by its own partition in the partition table 300. When an entry is first created, syntax checker 38 may have information on the start and the end location of the partition, as well as the nested scope number 308. (The nested scope number indicates the statement belongs to an imperative statement within another statement. The outermost statement has nested scope 0.)

ADD 1 TO AMT ON SIZE ERROR
MOVE 'Y' TO ERR-FLAG
DISPLAY 'error in amt'
END-ADD

In the above example, the ADD statement is a partition. Each of the statements after ON SIZE ERROR, the MOVE and DISPLAY is a separate partition. These separate partitions may be referred to as the sub-partitions of the enclosing ADD partition.

When a sub-task of syntax checker 38 parses the ADD partition, and the grammar reaches the ON SIZE ERROR phrase and the subsequent imperative statements, the sub-task may not parse these imperatives. Other sub-tasks of syntax checker 38 may parse these imperatives instead. Instead, the current sub-task of syntax checker 38 may skip over each imperative statement until the current sub-task reaches END-ADD. The current sub-task of syntax checker 38 may do that by checking the partition table 300. The start point location of a partition is in the partition table entry, and the end point location is also known. This way, the parsing algorithm implicitly is parallelizable, even within a single statement.

As syntax checker 38 performs the parsing, syntax checker 38 builds an AST (for the ADD statement in this example). Syntax checker 38 may hang the AST off in pointer 310 of the partition table 300. When processing comes to the nested imperative, since no actual parsing is done (yet) by this sub-task, syntax checker 38 may create a dummy node in the AST, with a pointer pointing to the sub-partition entry corresponding to the imperative statement(s). In one example approach, each sub-partition entry has its own AST; this may become the subtree of the enclosing partition's AST.

Figure 8:
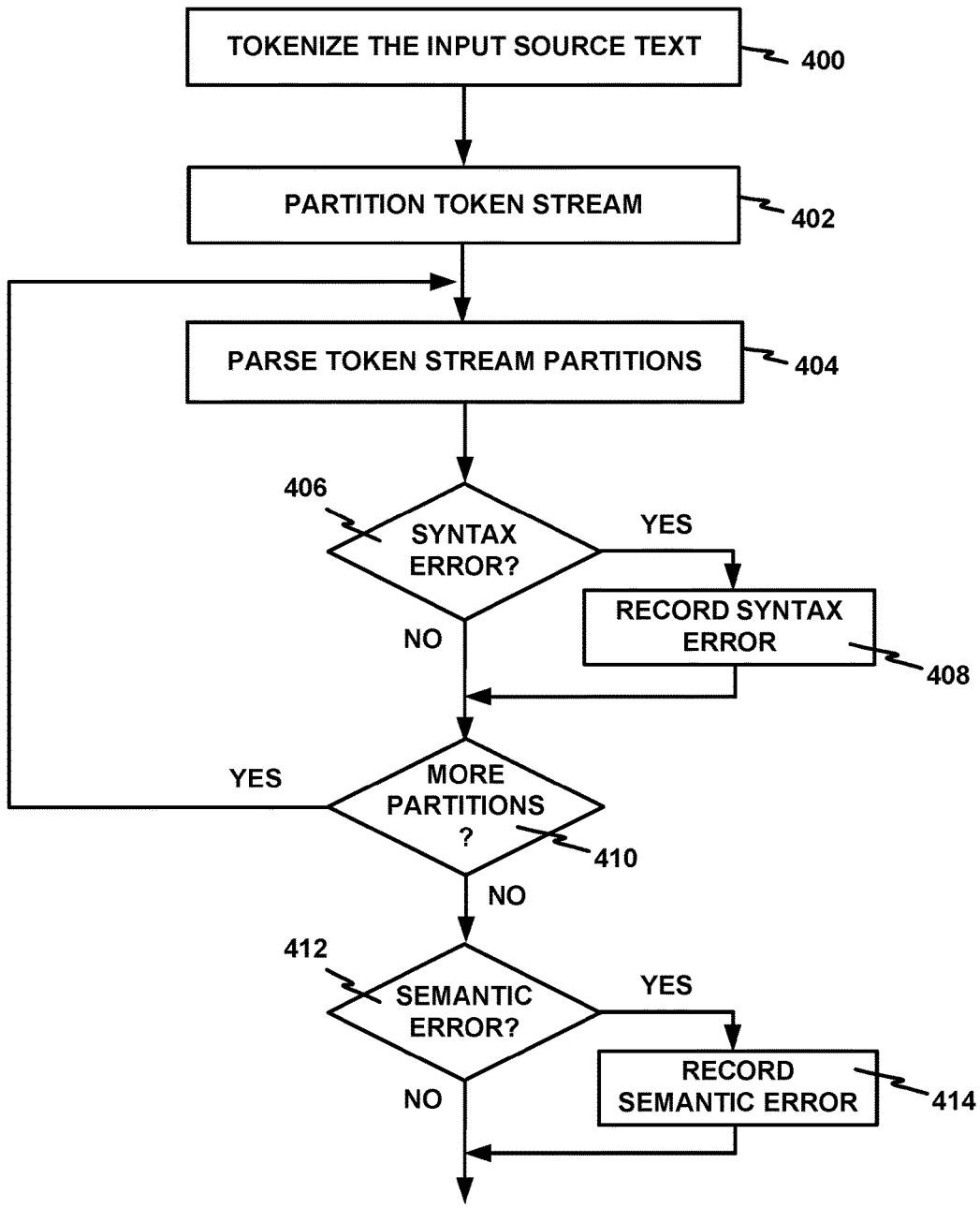
FIG. 8 depicts a flowchart of an example process that a syntax checker, executing on one or more computing devices 10 (e.g., servers, computers, processors, etc.), may perform, in one aspect of this disclosure.

FIG. 8 depicts a flowchart of an example process that a syntax checker, executing on one or more computing devices 10 (e.g., servers, computers, processors, etc.), may perform, in one aspect of this disclosure. In one example approach, syntax checker 38 tokenizes the input source text, forming a token stream (400). Syntax checker 38 partitions the token stream into partitions (402). In some example approaches, the partitions are represented by entries in the partition table 300 (partitioning is detailed in greater detail in the context of FIG. 9 below). Syntax checker 38 executes parallel sub-tasks where possible to process the partitions (404). In one example approach, syntax checker 38 initiates a series of partition parsing sub-tasks in parallel. In another example approach, syntax checker 38 starts as many sub-tasks as permitted by the user.

Syntax checker 38 checks for syntax errors (406). If a syntax error is detected, syntax checker 38 records the syntax error (408) and moves to 410. Otherwise, syntax checker 38 proceeds directly to 410.

In response to a partition processing sub-task finishing parsing a partition, syntax checker 38 checks to determine if there are remaining partitions in the partition table 300 (410). If there are remaining partitions in the partition table 300, the sub-task picks up the next partition and starts parsing (404). In one example approach, each partition parsing sub-task of syntax checker 38 builds an annotated syntax tree (AST) to represent the statement within the partition as parsing proceeds. If the partition parsing sub-task of syntax checker 38 encounters identifiers in the statement, the partition parsing sub-task searches symbol dictionary 330 to locate the symbol. If the symbol doesn't exist, the partition parsing sub-task of syntax checker 38 may create a new entry, with, in some approaches, a pointer 336 in dictionary 330 to an expected type list representing the expected type of this symbol, and a pointer back to the partition which imposed this type expectation. The latter is cross-referencing information that can be used, for example, in diagnostic.

In one example approach, if a symbol definition has been processed, the symbol type is known. The expected type list (if present) is collapsed, which can result in a diagnostic event (e.g., a definition type and expected type mismatch).

In one example approach, statements with conditional markers may contain imperative statements. In response to parsing reaching the conditional marker, the partition parsing sub-task of syntax checker 38 may skip over the imperative statement(s) and skip to the end of the partition. These imperative statements belong to another sub-partition and are handled by another partition parsing sub-task of syntax checker 38.

In one example approach, syntax checker 38 emits messages as diagnostic conditions are encountered. In one such example approach, syntax checker 38 detects syntax errors when parsing the partitions (406). In response to detecting a syntax error, syntax checker 38 records the syntax error (408) and then checks for more partitions to be parsed (410).

After all partitions are parsed, syntax checker 38 traverses symbol dictionary 330 to detect semantic errors (412) and, in response to detecting a semantic error, records the error (414). Either syntax checker 38 or compiler 44 then traverses the ASTs (by going down the partition table); compiler 44 then generates compiled program code, if desired.

If, however, only syntax checking is required, code generation is skipped. If the approach above is used in an IDE 40, after the initial (full) compilation, the partition table 300 and symbol table 330 are stored in memory 48. Later when the user edits the source code, syntax checking can be done by re-doing just the partition entries of partition table 300 that are changed. This may result in quick response time for IDE 40.

After the initial (full) compilation, when the user edits the source code, the partitions containing the changed text are identified. The start and end locations of such a changed partition are noted. The partition entry is removed from the partition table. This section of source text is then processed again using the reverse scanning algorithm to identify the new partition(s), which are added to the partition table. These new partitions are then processed by the syntax checker.

Figure 9:
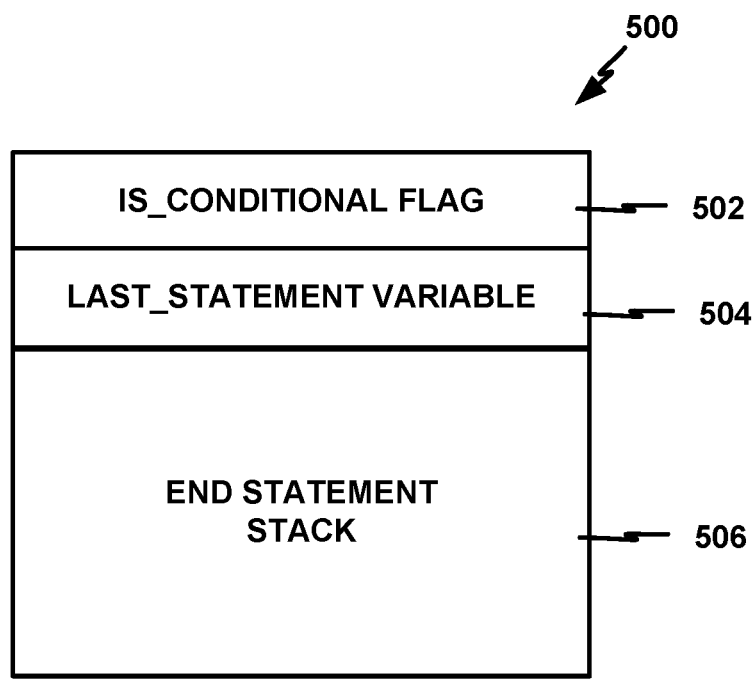
FIG. 9 illustrates representative memory structures used in one token stream partitioning approach, in one aspect of this disclosure.
Figure 10:
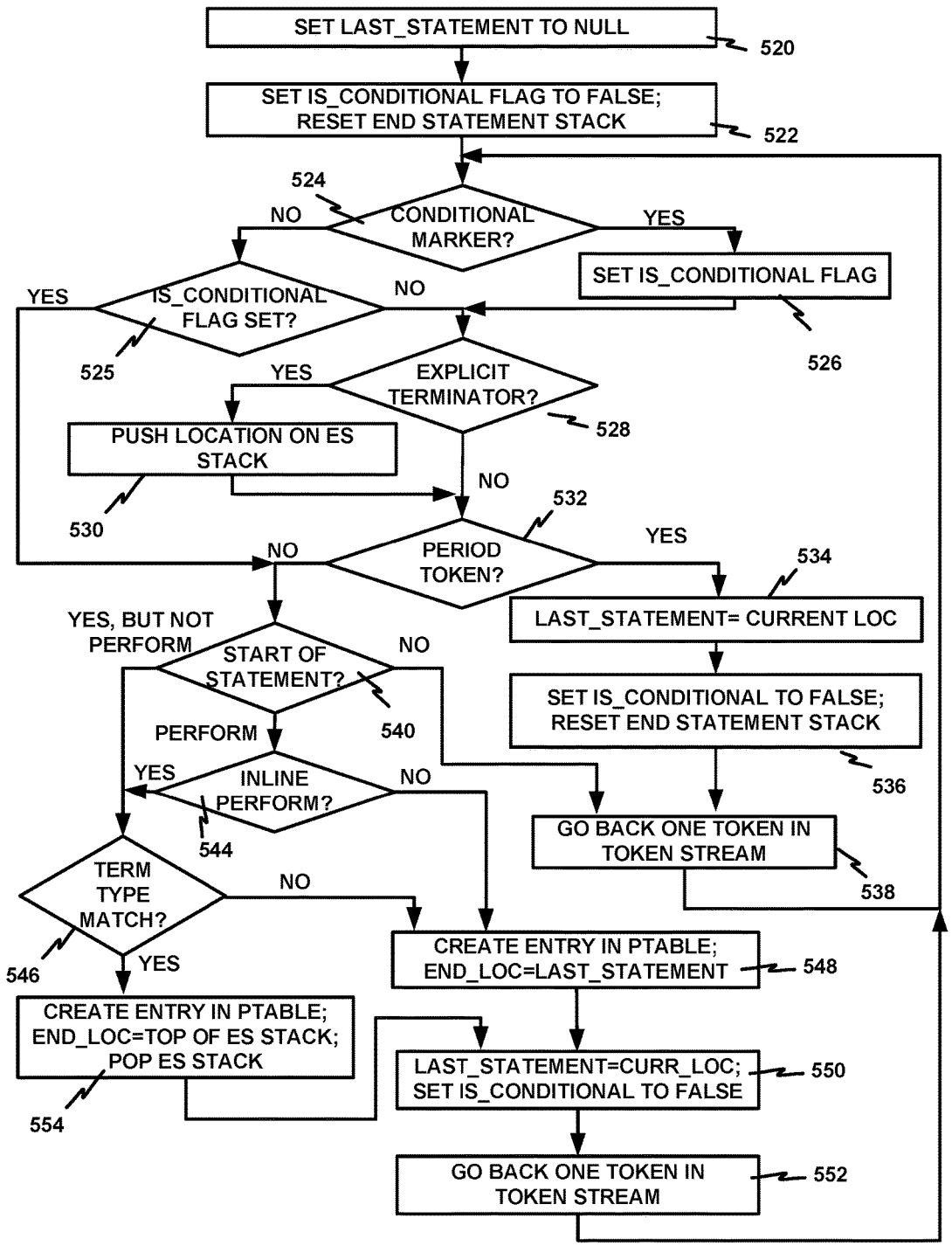
FIG. 10 depicts a flowchart of an example process that a syntax checker, executing on one or more computing devices may perform, in one aspect of this disclosure.

Partitioning the token stream may be described in the context of FIGS. 9 and 10. FIG. 9 illustrates representative memory structures used in one token stream partitioning approach, in one aspect of this disclosure. FIG. 10 depicts a flowchart of an example process that a syntax checker, executing on one or more computing devices may perform, in one aspect of this disclosure. An example based on the Procedure Division will be used for illustration purposes.

In one example approach, as is shown in FIG. 9, a syntax checker 38 operating on one or more computing devices 10 creates memory structures 500 for partitioning the token stream. In one such example approach, is_conditional flag 502 is a Boolean variable for tracking whether a current token stream location is a conditional marker. Is_conditional flag 502 is set to a true condition in response to syntax check 38 encountering a conditional marker. Syntax checker 38 stores token stream locations in last_statement 504 which may be used to store a token stream location and store pointers to locations in the token stream in end statement stack 506.

In the example shown in FIG. 10, syntax checker 38 initializes last_statement 504 to null (520). Syntax checker 38 then sets up end statement stack 506 and sets is_conditional flag 502 to false (522). Syntax checker 38 then starts processing the token stream, starting from the end of the stream and working backwards. Syntax checker 38 checks the token at the current token stream location to see if the token is a conditional marker (524). Representative examples include ON SIZE ERROR phrase and INVALID KEY phrase. In one example approach, syntax checker 38 treats statements like ADD . . . ON SIZE ERROR as conditionals in the grammar, while treating ON SIZE ERROR as a conditional marker.

In one example approach, conditional markers include ON SIZE ERROR, ON OVERFLOW, ON EXCEPTION, INVALID KEY, AT END, AT END-OF-PAGE, NOT ON SIZE ERROR, NOT ON OVERFLOW, NOT ON EXCEPTION, NOT INVALID KEY, NOT AT END and NOT AT END-OF-PAGE. In one example approach, syntax checker 38 may not treat IF or EVALUATE as conditional markers for this purpose.

If the check at 524 for a conditional marker indicates the token is a conditional marker, syntax checker 38 may set is_conditional flag to true (526) and move to 528. If the check at 524 for a conditional marker indicates the token is not a conditional marker, syntax checker 38 may move to 525 to check the IS_CONDITIONAL flag.

If the check at 525 for IS_CONDITIONAL flag is false (the flag is not set), syntax checker 38 may move to 528. Otherwise if the check for IS_CONDITIONAL flag is true, syntax checker 38 may continue processing at 540.

As shown in FIG. 10, syntax checker 38 checks the token at 528 to determine if the token at the current token stream location is an explicit statement terminator. In one example approach, the list of explicit statement terminators for a COBOL implementation includes END-ADD, END-CALL, END-COMPUTE, END-DELETE, END-DIVIDE, END-EVALUATE, END-IF, END-INVOKE, END-MULTIPLY, END-PERFORM, END-READ, END-RETURN, END-REWRITE, END-SEARCH, END-START, END-STRING, END-SUBTRACT, END-UNSTRING, END-WRITE and END-XML.

If the check at 528 determines the token at the current token stream location is not an explicit statement terminator, syntax checker 38 may move to 532. If, however, the check at 528 determines the token at the current token stream location is an explicit statement terminator, syntax checker 38 pushes the current token stream location on end statement stack 506 (530) before moving to 532.

At 532, syntax checker 38 determines if the token at the current token stream location is a period token. If the token at the current token stream location is a period token, syntax checker 38 sets last_statement 504 to point to the current token stream location (534), resets the is_conditional flag to false, and resets the end statement stack (i.e. un-pops all outstanding entries) (536). Syntax checker 38 then goes back one token in the token stream (538) before moving to 524.

If syntax checker 38 determines the token at the current token stream location is not a period token at 532, syntax checker 38 checks to see if the token at the current stream location is the start of a statement (540). In one example approach, the start of a statement is marked by statement_type tokens such as ADD or READ. In one example COBOL approach, statement_type tokens used include ADD, COMPUTE, DIVIDE, MULTIPLY, SUBTRACT, ACCEPT, INITIALIZE, INSPECT, MOVE, SET, STRING, UNSTRING, XML (GENERATE or PARSE), STOP (RUN), EXIT (PROGRAM or METHOD), GOBACK, ACCEPT, CLOSE, DELETE, DISPLAY, OPEN, READ, REWRITE, START, STOP, WRITE, MERGE, RELEASE, RETURN, SORT, ALTER, EXIT, GO (TO), PERFORM, CALL, CANCEL, INVOKE, IF, and EVALUATE.

If the syntax checker 38 determines that the token at the current token stream location is not the start of a statement (540), syntax checker 38 goes back one token in the token stream (538) before moving to 524.

If the syntax checker 38 determines that the token at the current token stream location is the start of a statement (540), syntax checker 38 then determines if the statement_type is PERFORM. If so, syntax checker 38 checks to determine if the PERFORM statement is an inline PERFORM (544) as will be detailed below.

If the syntax checker 38 determines that the token at the current token stream location is the start of a statement (540) and that the statement_type is not PERFORM (544), syntax checker 38 determines if the current statement_type has a corresponding implicit statement terminator and if the top of end statement stack 506 matches this statement type (546). If so, the entry at the top of end statement stack 506 is the end location of this partition. Syntax checker 38 creates an entry in partition table 300, stores a starting point location 302, stores an end point location 304 read from end statement stack 506, stores other information as discussed in the context of FIG. 6 above, and pops end statement stack 506 (554). Syntax checker 38 then saves the current location as the new last statement and sets is_conditional flag to false (550), goes back one token in the token stream (552), and returns to 524 as long as any tokens remain to be processed.

If, at 546, syntax checker 38 determines that the current statement_type either does not have a corresponding implicit statement terminator or that the top of end statement stack 506 does not match the statement_type (546), syntax checker 38 turns to the last_statement variable 504 for the end point location 304 of the partition (548). Syntax checker 38 creates an entry in partition table 300, stores a starting point location 302, stores an end point location 304 as indicated by last_statement variable 504, stores other information as discussed in the context of FIG. 6 above, and pops end statement stack 506 (554). Syntax checker 38 then saves the current location as the new last statement and sets is_conditional flag to false (550), goes back one token in the token stream (552), and returns to 524 as long as any tokens remain to be processed.

In one example approach, syntax checker 38 sets the end point location to one token past the last token within a partition. If the statement of this partition ends with an explicit statement terminator (END-ADD, etc.), then the statement terminator is the end location. In any case, syntax checker 38 may set last_statement to the current token stream location (e.g., the current token stream location is now the new last_statement) and set is_conditional flag to false (550).

If, at 540, syntax checker 38 determines that the statement_type is PERFORM, additional checking is needed to determine the presence of a matching END-PERFORM terminator. Syntax checker 38 first determines if the PERFORM statement is an inline PERFORM (544). To do so, syntax checker 38 first checks the token immediately following PERFORM. If the token immediately following PERFORM is a statement_type token (i.e., the start of a statement), then this is an inline PERFORM. Syntax checker 38 checks the top of the end statement stack 506 to see if the top of the end statement stack 506 is an END-PERFORM token (546), and processes the inline PERFORM accordingly.

If syntax checker 38 determines that the token immediately following the PERFORM is not a statement_type token, then syntax checker 38 checks the token two locations after the PERFORM. If the token is the TIMES keyword, then this is also an inline PERFORM. Syntax checker 38 then checks the top of the end statement stack 506 to see if the top of the end statement stack 506 is an END-PERFORM token (546), and processes the inline PERFORM accordingly.

If syntax checker 38 determines, at 544, that the token immediately following the PERFORM is not a statement_type token and that the token two locations after the PERFORM is not the TIMES keyword, then this is not an inline PERFORM. Syntax checker 38 creates an entry in partition table 300, stores a starting point location 302, stores an end point location 304 read from last_statement variable 504, and stores other information as discussed in the context of FIG. 6 above (548). Syntax checker 38 then saves the current location as the new last statement and sets is_conditional flag to false (550), goes back one token in the token stream (552), and returns to 524 as long as any tokens remain to be processed.

Thus, parallel parsing methods are disclosed for programs in programming languages such as COBOL. These methods may be particularly useful in an IDE where quick respond time is needed. These methods may be implemented as syntax checker 38. While various examples are discussed in terms of COBOL programs, other examples may be directed to programs in C++, the JAVA™ programming language, C, C#, or any other compiled programming language.

Various methods disclosed herein are different from other approaches in that, for example, syntax checker 38 scans the token stream backwards, instead of forward, to detect key points in the grammar. This approach analyzes the input token stream efficiently, and groups tokens into partitions that can be processed in parallel. Various methods disclosed herein may also avoid the heavy machinery of a full parser, which requires the full grammar of the complete language. In methods as described above, syntax checker 38 may parse non-sequentially, instead of in the traditional processing from beginning to end in a linear manner.

Due to response time requirements, syntax checkers in an IDE often use different parsing methods than the corresponding production compilers. This can create usability issues as the two support different grammars (different compiler releases). By design, various aspects of the approach described above may be used both as a syntax checker and in the corresponding production language compiler. Thus, implementations of this disclosure may avoid usability issues due to grammar mismatch.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    tokenizing, with one or more processing devices, input source text to form a token stream having a plurality of tokens, wherein the input source text is organized in two or more divisions and includes a plurality of statements in a compiled programming language and wherein each token has a location;
    partitioning, with the one or more processing devices, the token stream into partitions by division and by statement, wherein partitioning by statement includes storing an entry representing each partition in a partition table and wherein partitioning by statement further includes scanning the token stream in reverse starting at a statement end;
    parsing, with the one or more processing devices, two or more of the partitions in parallel, wherein parsing the partitions in parallel includes building, for each statement partition, an annotated syntax tree (AST) to represent the statement, storing, for each symbol, an entry in a common symbol dictionary, and generating error messages corresponding to syntax errors detected while parsing the partitions; and traversing, with the one or more processing devices, the common symbol dictionary to detect semantic errors;
wherein scanning the token stream in reverse includes:
determining, for each token, if the current token stream location is a conditional marker and, if the current token stream location is a conditional marker, setting a conditional marker flag;
determining, for each token, if the current token stream location is an explicit statement terminator and, if the current token stream location is an explicit statement terminator, storing the current token stream location as a latest end statement location; and
determining, for each token, if the current token stream location is a period token and, if the current token stream location is a period token, noting the end of a statement.

2. The method of claim 1, wherein, for statements with conditional markers, parsing the partitions further includes skipping imperative statements following conditional markers.

3. The method of claim 1, wherein traversing the common symbol dictionary includes determining, for each symbol in the common symbol dictionary, if an expected type for the symbol matches a definition type and, if the expected type for the symbol does not matches the definition type for the symbol, generating a type mismatch error.

4. The method of claim 1, wherein the method further comprises traversing, with the one or more processing devices, the ASTs as a function of the partition table and generating, with the one or more processing devices, compiled program code.

5. The method of claim 1, wherein the method further comprises:
retrieving, with the one or more processing devices and from memory, the partition table and the common symbol dictionary;
receiving changes to the input source text;
syntax checking the changed input source text, wherein syntax checking includes parsing each partition with changed input source text, wherein parsing includes:
building an annotated syntax tree to represent each statement in the partition that has changed;
storing, for each new symbol, an entry in the common symbol dictionary; and
generating error messages corresponding to syntax errors encountered while parsing partitions with changed input source text; and
traversing, with the one or more processing devices, the new symbols in the common symbol dictionary to detect semantic errors.

6. The method of claim 5, wherein the method further comprises traversing the ASTs as a function of the partition table and generating compiled program code.

7. The method of claim 1, wherein scanning the token stream in reverse includes determining, for each token, if the current token stream location includes a token from a group of tokens including a conditional marker, an implicit statement terminator, and the start of a statement.

8. The method of claim 1, wherein scanning the token stream in reverse further includes determining, for each token, if the current token stream location is the start of a statement.

9. The method of claim 1, wherein scanning the token stream in reverse includes:
determining, for each token, if the current token stream location is the start of a statement and, if the current token stream location is the start of a statement, determining if a statement type associated with the statement has a corresponding implicit statement terminator; and
if the statement type associated with the statement has a corresponding explicit implicit statement terminator and the token stream location stored as the latest end statement has a statement type that matches the statement type associated with the statement, noting the token stream location stored as the latest end statement as last token in the partition.

10. The method of claim 1, wherein scanning the token stream in reverse includes:
determining, for each token, if the current token stream location is the start of a statement and, if the current token stream location is the start of a statement, determining if a statement type associated with the statement has a corresponding explicit statement terminator; and
if the statement type associated with the statement does not have a corresponding explicit statement terminator or the token stream location stored as the latest end statement has a statement type that is different than the statement type associated with the statement, using a token stream location associated with a period token as last token in the partition.

11. A computer program product comprising a computer-readable memory medium having program code embodied therewith, the program code executable by a computing device to:
tokenize input source text to form a token stream having a plurality of tokens, wherein the input source text is organized in two or more divisions and includes a plurality of statements in a compiled program language and wherein each token has a location;
partition the token stream into partitions by division and by statement, wherein partitioning by statement includes storing an entry representing each partition in a partition table and wherein partitioning by statement further includes scanning the token stream in reverse starting at a statement end;
parse two or more of the partitions in parallel, wherein parsing the partitions in parallel includes building, for each statement partition, an annotated syntax tree (AST) to represent the statement, storing, for each symbol, an entry in a common symbol dictionary, and generating error messages corresponding to syntax errors detected while parsing the partitions; and
traverse the common symbol dictionary to detect semantic errors;
wherein the program code for scanning the token stream in reverse includes program code executable by the computing device to:
determine, for each token, if the current token stream location is an explicit statement terminator and, if the current token stream location is an explicit statement terminator, storing the current token stream location as a latest end statement;
determine, for each token, if the current token stream location is a period token and, if the current token stream location is a period token, noting the end of a statement;
determine, for each token, if the current token stream location is the start of a statement and, if the current token stream location is the start of a statement, determining if a statement type associated with the statement has a corresponding explicit statement terminator; and
if the statement type associated with the statement does not have a corresponding explicit statement terminator or the token stream location stored as the latest end statement has a statement type that is different than the statement type associated with the statement, use a token stream location associated with a period token as last token in the partition.

12. The computer program product of claim 11, wherein the program code is further executable by the computing device to:
retrieve the partition table and the common symbol dictionary;
receive changes to the input source text; and
syntax check the changed input source text, wherein syntax checking includes parsing each partition with changed input source text, wherein parsing includes:
building an annotated syntax tree to represent each statement in the partition that has changed;
storing, for each new symbol, an entry in the common symbol dictionary; and
generating error messages corresponding to syntax errors encountered while parsing partitions with changed input source text; and
traverse the new symbols in the common symbol dictionary to detect semantic errors.

13. The computer program product of claim 11, wherein the program code is further executable by the computing device to traverse the ASTs as a function of the partition table and generating compiled program code.

14. A computer system comprising:
one or more processors, one or more computer-readable memories, and one or more computer-readable storage mediums;
program instructions, stored on at least one of the one or more storage mediums for execution by at least one of the one or more processors via at least one of the one or more memories, to tokenize input source text to form a token stream having a plurality of tokens, wherein each token has a location and wherein the input source text is organized in two or more divisions and includes a plurality of statements in a compiled program language;
program instructions, stored on at least one of the one or more storage mediums for execution by at least one of the one or more processors via at least one of the one or more memories, to partition the token stream into partitions by division and by statement, wherein partitioning by statement includes storing an entry representing each partition in a partition table and wherein partitioning by statement further includes scanning the token stream in reverse starting at a statement end, wherein the program instructions to partition the token stream into partitions by division and statement include:
program instructions, for execution by at least one of the one or more processors, to determine, for each token, if the current token stream location is an explicit statement terminator and, if the current token stream location is an explicit statement terminator, to store the current token stream location as a latest end statement;
program instructions, for execution by at least one of the one or more processors, to determine, for each token, if the current token stream location is a period token and, if the current token stream location is a period token, to note the end of a statement;
program instructions, for execution by at least one of the one or more processors, to determine, for each token, if the current token stream location is the start of a statement and, if the current token stream location is the start of a statement, to determine if a statement type associated with the statement has a corresponding explicit statement terminator; and
program instructions, for execution by at least one of the one or more processors, to use a token stream location associated with a period token as last token in the partition, if the statement type associated with the statement does not have a corresponding explicit statement terminator or if the token stream location stored as the latest end statement has a statement type that is different than the statement type associated with the statement;
program instructions, stored on at least one of the one or more storage mediums for execution by at least one of the one or more processors via at least one of the one or more memories, to parse two or more of the partitions in parallel with the one or more processors, wherein parsing the partitions in parallel includes building, for each statement partition, an annotated syntax tree (AST) to represent the statement, storing, for each symbol, an entry in a common symbol dictionary, and generating error messages corresponding to syntax errors detected while parsing the partitions; and
program instructions, stored on at least one of the one or more storage mediums for execution by at least one of the one or more processors via at least one of the one or more memories, to traverse the common symbol dictionary to detect semantic errors.

15. The computer system of claim 14, wherein the computer system further comprises:
program instructions, stored on at least one of the one or more storage mediums for execution by at least one of the one or more processors via at least one of the one or more memories, to retrieve the partition table and the common symbol dictionary;
program instructions, stored on at least one of the one or more storage mediums for execution by at least one of the one or more processors via at least one of the one or more memories, to receive changes to the input source text;
program instructions, stored on at least one of the one or more storage mediums for execution by at least one of the one or more processors via at least one of the one or more memories, to syntax check the changed input source text, wherein syntax checking includes parsing each partition with changed input source text, wherein parsing includes:
building an annotated syntax tree to represent each statement in the partition that has changed;
storing, for each new symbol, an entry in the common symbol dictionary; and
generating error messages corresponding to syntax errors encountered while parsing partitions with changed input source text; and
program instructions, stored on at least one of the one or more storage mediums for execution by at least one of the one or more processors via at least one of the one or more memories, to traverse the new symbols in the common symbol dictionary to detect semantic errors.

16. The computer system of claim 15, wherein the computer system further comprises:
program instructions, stored on at least one of the one or more storage mediums for execution by at least one of the one or more processors via at least one of the one or more memories, to traverse the ASTs as a function of the partition table and to generate compiled program code.

* * * * *